(12) United States Patent
Byltiauw

(10) Patent No.: US 11,563,354 B2
(45) Date of Patent: Jan. 24, 2023

(54) ELECTRIC MOTOR COOLING SYSTEM AND METHOD FOR OPERATION OF SAID SYSTEM

(71) Applicant: Dana Belgium N.V., Bruges (BE)

(72) Inventor: Matthias Byltiauw, Hooglede (BE)

(73) Assignee: Dana Belgium N.V., Bruges (BE)

( * ) Notice: Subject to any disclaimer, the term of this patent is extended or adjusted under 35 U.S.C. 154(b) by 286 days.

(21) Appl. No.: 16/810,581

(22) Filed: Mar. 5, 2020

(65) Prior Publication Data

US 2021/0281142 A1    Sep. 9, 2021

(51) Int. Cl.
*H02K 5/20* (2006.01)
*H02K 3/24* (2006.01)
*H02K 9/19* (2006.01)

(52) U.S. Cl.
CPC ............... *H02K 5/203* (2021.01); *H02K 3/24* (2013.01); *H02K 9/19* (2013.01)

(58) Field of Classification Search
CPC .. H02K 3/24; H02K 5/20; H02K 9/19; H02K 9/197; H02K 9/22; H02K 5/18; H02K 1/20; H02K 3/30; H02K 3/32; H02K 3/38; H02K 5/203; H02K 9/193
See application file for complete search history.

(56) References Cited

U.S. PATENT DOCUMENTS

| | | | |
|---|---|---|---|
| 6,313,556 B1 | 11/2001 | Dombrovski et al. | |
| 7,633,193 B2 | 12/2009 | Masoudipour et al. | |
| 7,675,209 B2 | 3/2010 | Masoudipour et al. | |
| 2004/0201292 A1* | 10/2004 | Hoppe | H02K 15/14 310/58 |
| 2011/0234028 A1* | 9/2011 | Iwasaki | H02K 9/223 310/52 |
| 2013/0162071 A1* | 6/2013 | Chamberlin | H02K 9/22 310/64 |
| 2016/0006302 A1* | 1/2016 | Gugel | H02K 9/19 310/54 |
| 2017/0201141 A1 | 7/2017 | Rollins et al. | |
| 2017/0271954 A1* | 9/2017 | Hanumalagutti | H02K 5/203 |
| 2020/0358325 A1* | 11/2020 | Yun | H02K 15/02 |
| 2021/0126511 A1* | 4/2021 | Coppola | H02K 7/006 |
| 2021/0249929 A1* | 8/2021 | Bremner | H02K 9/19 |

FOREIGN PATENT DOCUMENTS

| | | |
|---|---|---|
| DE | 102015006526 A1 | 11/2015 |
| DE | 102016204980 A1 | 9/2017 |
| DE | 102016119243 A1 * | 4/2018 |
| WO | 2017211360 A1 | 12/2017 |

OTHER PUBLICATIONS

Machine Translation of DE 102016119243 A1 (Year: 2018).*

* cited by examiner

*Primary Examiner* — Quyen P Leung
*Assistant Examiner* — Christopher S Leone
(74) *Attorney, Agent, or Firm* — McCoy Russell LLP

(57) ABSTRACT

Methods and systems for cooling an electric motor are provided. An electric motor cooling system, in one example, includes a stator with a first end winding on a first axial side, potting material at least partially enclosing the first end winding, and a plurality of coolant passages adjacent to the stator, where at least a portion of the plurality of coolant passages are adjacent to the potting material. The electric motor cooling system also includes a coolant passage housing including a plurality of fins defining a portion of the boundaries of the plurality of coolant passages and in face sharing contact with an outer surface of the stator.

20 Claims, 3 Drawing Sheets

ELECTRIC MOTOR COOLING SYSTEM AND METHOD FOR OPERATION OF SAID SYSTEM

FIELD

The present disclosure relates to cooling systems for electric motors and methods for operation of the cooling systems.

BACKGROUND

A motor's thermodynamic framework plays a role in its performance. Some motors utilize cooling jackets (e.g., water or oil cooling jackets) to remove heat from the motor's stator. However, compact packaging goals of certain motors and motor cooling targets may be competing characteristics. Increasing the motor's power density can amplify the tradeoffs made between motor cooling and compactness. As such, previous motor cooling jackets, in some cases, may not achieve desired motor cooling targets when the motor's compactness and power output is increased.

Particular electric motor designs include potted end windings in the stator, enabling heat to be drawn out of the stator via conductance. However, potting conductance may, in certain scenarios, fall short of removing a targeted amount of heat generated in motors with a relatively high power density. These cooling deficits, in some instances, lead to decreased motor efficiency and performance.

SUMMARY

To overcome at least some of the aforementioned challenges an electric motor cooling system is provided. The electric motor cooling system, in one example, includes a stator with an end winding on an axial side. The electric motor cooling system also includes potting material at least partially enclosing the end winding. The electric motor cooling system further includes a plurality of coolant passages adjacent to the stator. At least a portion of the plurality of coolant passages are adjacent to the potting material. The electric motor cooling system also includes a coolant passage housing having a plurality of fins defining a portion of the boundaries of the plurality of coolant passages and in face sharing contact with an outer surface of the stator. In this way, coolant may traverse sections of the motor adjacent to the end windings enclosed by the potting material. Providing coolant passages and a corresponding housing with these characteristics allows a greater amount of heat to be space efficiently removed from the stator's end windings, if desired, in relation to previous motor cooling jackets circulating coolant in passages spaced away from the end windings. Motor efficiency and performance may be increased as a result of the increased motor cooling.

In another example, at least a portion of the fins of the coolant passage housing may extend into the potting material of the stator's end winding. In this way, fin conductance in conjunction with liquid cooling can be utilized to extract an even greater amount of heat from the end windings via a compact cooling system arrangement. Consequently, motor efficiency and performance can be further increased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

An electric motor cooling system designed to increase the amount of heat removed from stator end windings is described herein. The motor cooling system includes a cooling jacket routing a coolant adjacent to potting material surrounding the stator's end windings. Specifically, in one example, the cooling jacket may flow coolant adjacent to opposing axial sides of the stator's end windings. The cooling jacket can therefore extract a greater amount of heat from the stator's end windings. In another example, a housing forming at least a portion of the cooling jacket channel boundaries, includes sections in face sharing contact with the axial end surfaces of the potting material. In this way, a greater amount of heat may be drawn out of the end winding via conductance through the housing. In yet another example, the housing may include fins axially extending into the potting material enclosing the stator's end winding. This fin arrangement provides a space efficient design that further increases end winding cooling. Further, in certain examples, the housing may additionally include fins extending axially away from opposing axial sides of the housing, to further increase motor cooling. The aforementioned motor cooling system designs increase the amount of heat extracted from the electric motor during operation, thereby increasing motor efficiency and performance.

Figure 1:
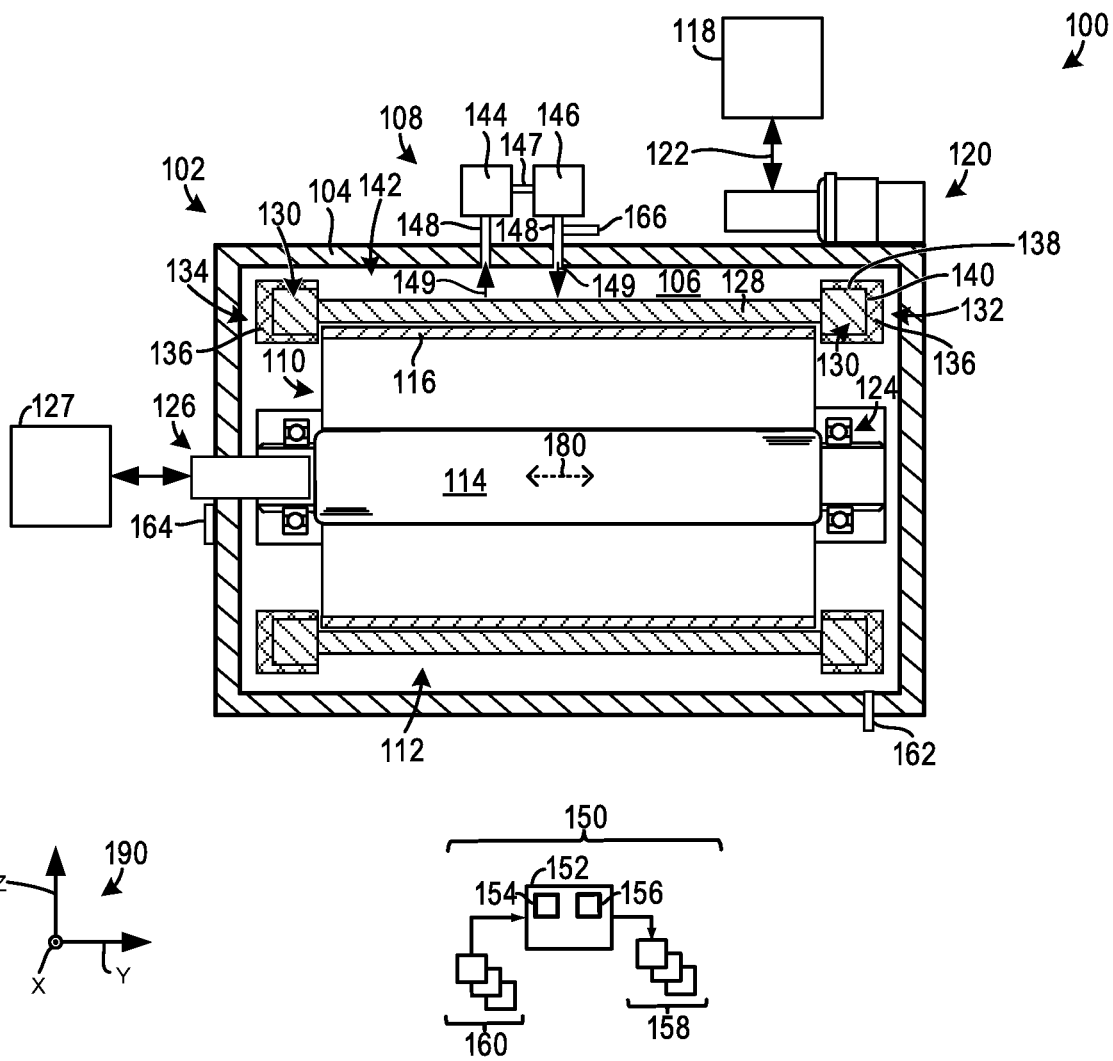
FIG. 1 is an illustration of an electric motor and cooling system.

FIG. 1 shows a high-level depiction of an electric motor and motor cooling system. FIGS. 2-5 depict different embodiments of electric motor cooling systems designed to transfer a greater amount of heat away from stator end windings by way of potting material surrounding the end windings. FIG. 6 shows a method for operating a cooling system to decrease the temperature of stator end windings via coolant flow and fin conductance.

FIG. 1 illustrates an electric motor 100 which may be deployed in variety of operating environments including: automotive applications (e.g., light, medium, and heavy duty vehicles), industrial settings, agricultural equipment, etc. For instance, in one use-case scenario, the electric motor 100 may be integrated in a hybrid vehicle or battery electric vehicle (BEV).

A variety of suitable electric motor configurations may be used depending on the end-use design goals. For instance, both direct current (DC) motors (e.g., brushed or brushless motors) and alternating current (AC) motors have been envisioned. AC motor types include asynchronous (e.g., squirrel cage and wound rotor) and synchronous style motors. Synchronous motors such as one and three phase, may be used, in certain embodiments. The styles of three phase motors that may be deployed include permanent magnet, synchronous reluctance, synchronous induction, and hysteresis. In one use-case scenario, such as the BEV scenario, an AC motor may be used due to its increased energy conversion efficiency, higher power density, greater reliability, and less maintenance stemming from the reduced (e.g., avoidance) of mechanical wear between the stator and rotor, and regenerative braking efficacy in comparison to DC motors. Continuing with the AC motor use-case, a permanent magnet or other suitable synchronous AC motor may be utilized, in some instances, due to its high conversion efficiency. However, in other instances, an induction AC motor may be used due to its lower component cost in comparison to permanent magnet motors utilizing costlier rare earth metals.

Regardless of the specific type of electric motor used, the electric motor 100 includes a coolant passage housing 102 with a wall 104 enclosing interior components. The wall may form a continuous (e.g., monolithic) structure containing a working fluid 106 (e.g., oil, coolant (e.g., a mixture of water and glycol), water, and the like) in a cooling system 108, described in greater detail herein.

The motor 100 includes a rotor 110 and a stator 112. Although, the motor 100 is embodied in FIG. 1 as an internal rotor motor where the stator at least partially surrounds the rotor, an external rotor motor configuration may be used, in alternate embodiments.

The rotor 110 includes a rotor shaft 114 and a magnetically interactive portion 116 designed to electromagnetically interact with the stator 112 to generate torque in an output mode or, in some instances, generate electrical energy in the stator in a regenerative mode. Thus, the motor 100 may be designed to generate output torque using electrical energy from an energy source 118 (e.g., energy storage device such as a battery, capacitor, etc.) The electric motor 100 includes an electrical interface 120 embodied as a bus bar. However, numerous suitable electrical interfaces have been contemplated, such as cables, electrical ports, combinations thereof, etc. It will be appreciated that electrical energy may be transferred between the energy source 118 and the electrical interface 120. This energy transfer is indicated via arrow 122.

The magnetically interactive portion 116 of the rotor 110 may include permanent magnetic material, in one example. However, in other examples, the magnetically interactive portion 116 may be configured as an electromagnet. Bearings 124 are shown coupled to the rotor shaft 114. The bearings are illustrated as ball bearings. However, other suitable types of bearings have been envisioned such as roller bearings, journal bearings, etc. The bearings 124 allow the rotor shaft 114 to rotate and provide radial and/or axial support thereto. The rotor shaft 114 is also shown including a rotational interface 126 designed to rotationally attach to a component 127 designed to receive rotational input from the motor and, in some cases, impart torque to the motor for regeneration. For example, in the vehicle use-case example the rotational interface 126 may be coupled to a shaft in a gearbox. However, as previously discussed, the motor may be deployed in a variety of operating environments.

The motor's rotational axis 180 is provided in FIG. 1 as well as FIGS. 2-5 for reference. An axis system 190 including an x-axis, y-axis, and z-axis is also provided in FIGS. 1-5, for reference. The z-axis may be a vertical axis, the x-axis may be a lateral axis, and/or the y-axis may be a longitudinal axis, in one example. However, the axes may have other orientations, in other examples.

The stator 112 includes a central section 128 (e.g., stator core) and end windings 130. The central section 128 may include laminated sections with windings extending therethrough, in some examples. However, other suitable configurations of the central section have been contemplated. The windings may be constructed out of conductive material such as copper or other suitable metal. The central section may be constructed of out of iron, steel, copper, etc. The end windings 130 are positioned on axially opposing sides 132, 134 of the stator 112. The central section 128 and the end windings 130 are designed to receive electrical energy from or flow electrical energy to the electrical interface 120. For instance, wires, circuits, etc., may be used to achieve the aforementioned electrical energy transfer.

Potting material 136 is shown surrounding the end windings 130. Specifically, the potting material 136 is shown extending along axial aligned surfaces 138 (e.g., circumferential surfaces) of the end windings 130 and down radially extending sections 140 of the end windings 130. In some embodiments, the potting material 136 may include a resin (e.g., epoxy resin), thermosetting plastics (e.g., urethane), silicone, combinations thereof, etc. It will be appreciated that the type of potting material may be selected to achieve a relatively high thermal conductivity to increase the amount of heat that may be drawn away from the stator via the cooling system 108. However, cost considerations may also be taken into account when selecting the potting material.

The coolant passage housing 102 encloses the rotor 110 and the stator 112. Additionally, the coolant passage housing 102 forms a boundary of coolant passages 142 in the cooling system 108. Although, FIG. 1 depicts, coolant passage housing 102 and the coolant passages 142 schematically at high level, it will be understood that the coolant passage housing 102 may have greater structural complexity. For example, the coolant passage housing 102 may include a plurality of fins extending inward toward the stator 112 and multiple coolant passages positioned between the fins. The coolant passages between the fins may be coupled in a series and/or parallel flow arrangement. Various layouts of the fins and coolant passages are described in greater detail herein with regard to FIGS. 2-5.

A heat exchanger 144 in fluidic communication with a coolant pump 146 via coolant conduit 147 are also included in cooling system 108. The heat exchanger 144 is designed to flow heat from the coolant traveling therethrough to the surrounding environment or other suitable medium (e.g., water, oil, glycol, and the like). To accomplish the heat transfer functionality the heat exchanger 144 may include components such as conduits, fins, a housing, etc. The coolant pump 146 is designed to circulate coolant through the coolant passages 142 and may include conventional components such as chambers, pistons, valves, impellers, etc., to accomplish the coolant circulation functionality. Coolant conduits 148 are shown extending between the pump 146 and the coolant passages 142 and the heat exchanger 144 and the coolant passages. Arrows 149 depict the general direction of coolant flow through the conduits 148. The coolant conduits 148 are specifically shown extending through an upper portion of the housing 102. However, numerous suitable coolant conduit arrangements have been envisioned. For instance, the coolant conduit in fluidic communication with the coolant pump may extend through one axial side of the housing and the coolant conduit in fluidic communication with the heat exchanger may extend through the opposing axial side of the housing. Further, in another example, one coolant conduit may extend through a lower side of the housing while the other coolant conduit may extend through an upper side of the housing.

The electric motor 100 and the cooling system 108 may be electronically coupled to a control system 150 with a controller 152. The controller 152 includes a processor 154 and memory 156. The memory 156 may hold instructions stored therein that when executed by the processor cause the controller 152 to perform the various methods, control techniques, etc., described herein. The processor 154 may include a microprocessor unit and/or other types of circuits. The memory 156 may include known data storage mediums such as random access memory, read only memory, keep alive memory, combinations thereof, etc. Furthermore, it will also be understood that the memory 156 may include non-transitory memory.

The controller 152 may be configured to send control commands to system components 158 as well as receive signals from sensors 160 and other suitable components. The controllable components may include the electric motor 100 (e.g., the motor's stator), the cooling system 108 (e.g., the coolant pump 146), etc. It will be understood that the controllable components may include actuators to enable the component adjustment. The sensors may include a motor temperature sensor 162, a motor speed sensor 164, a coolant flowrate sensor 166, etc. As such, the controller 152 may receive a signal indicative of the motor's temperature and adjust the output of the coolant pump 146 based on the temperature signal. The other controllable components in the electric motor and cooling system may function in a similar manner. Furthermore, it will be understood that the controller 152 may send and receive signals via wired and/or wireless communication.

FIGS. 2-5 illustrate different cooling system embodiments for an electric motor in cross-section. It will be appreciated that the cooling systems and electric motors shown in FIGS. 2-5 are embodiments of the electric motor 100 and the cooling system 108, depicted in FIG. 1. As such, the structural and functional features of the electric motor 100 and the cooling system 108 described above with regard to FIG. 1 may be included in any of the motor and cooling system embodiments illustrated in FIGS. 2-5 or vice versa. To elaborate, the cooling jackets shown in FIGS. 2-5 may be in fluidic communication with a coolant pump, such as the coolant pump 146 shown in FIG. 1, and a heat exchanger, such as the heat exchanger 144 shown in FIG. 1.

Figure 2:
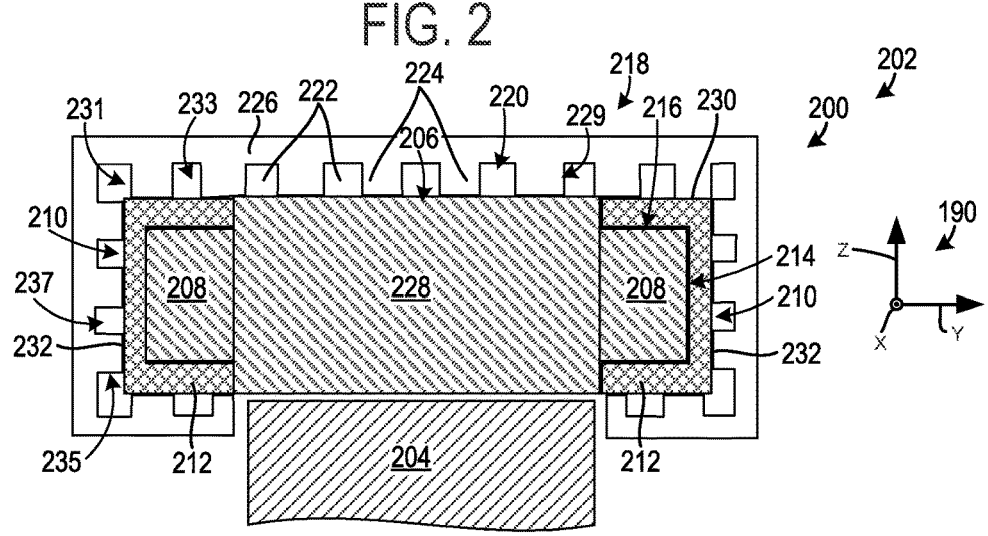
FIG. 2 is a first example of a cooling system for an electric motor.

Turning specifically to FIG. 2 depicting a cooling system 200 and electric motor 202 again including a rotor 204 and a stator 206 having end windings 208 at opposing axial sides 210 of the stator. The end windings 208 are at least partially enclosed via potting material 212. To elaborate, for each end windings 208, the potting material 212 extends along an axial side 214 and at least partially along a circumferential surface 216 of the end winding. The cooling system 200 includes a coolant passage housing 218 and a cooling jacket 220 with a plurality of coolant passages 222. The housing 218 as well as the other coolant jacket housings described herein may be constructed out of a thermally conductive material such as aluminum, steel, combinations thereof, etc. In one example, the housing may be at least partially constructed out of aluminum due to its higher thermal conductivity than steel. For instance, the housing's fins may be constructed out of aluminum.

A plurality of fins 224 in the housing 218 form boundaries of the coolant passages 222. Specifically, the fins 224 are shown extending from a body 226 of the housing 218 inwards towards the stator 206. A portion 229 of the fins 224 are shown in face sharing contact with a central stator section 228. Another portion 231 of the fins 224 are also shown in face sharing contact with circumferential surfaces 230 of the potting material 212. Correspondingly, a portion 233 of the coolant passages 222 traverse a section of the motor adjacent to the circumferential surfaces 230 of the potting material 212. Routing the coolant passages in this way enables stator cooling to be increased when compared to cooling systems that do not route coolant near the end windings. Consequently, motor efficiency and performance can be increased, if desired. Another portion 235 of the fins 224 are shown in face sharing contact with axial ends 232 of the potting material 212. Correspondingly, a portion 237 of the coolant passages 222 are adjacent to the axial ends 232 of the potting material to further increase end winding cooling.

In one example, the size and shape of the fins in the housing may be substantially similar. However, in another example, the size and/or shape of the fins may vary between the different fins. The relative size and profile of the fins may be granularly selected to achieve cooling targets of different components in the motor. For instance, the size and profile of the fins may be selected based on cooling targets of various motor components, expected operating temperature of the components, material construction of the components, etc.

The coolant passages 222 may, in some examples, have a series flow arrangement, a parallel flow arrangement, or a combination of a series and parallel flow arrangement. For instance, in one use-case example, sequential coolant passages may be coupled in series. In another use-case example, the cooling passages on the opposing axial ends of the stator may have a parallel flow arrangement. The flow configuration may be chosen based on factors such as the expected operating temperatures of the different components, material construction of the components, etc.

Figure 3:
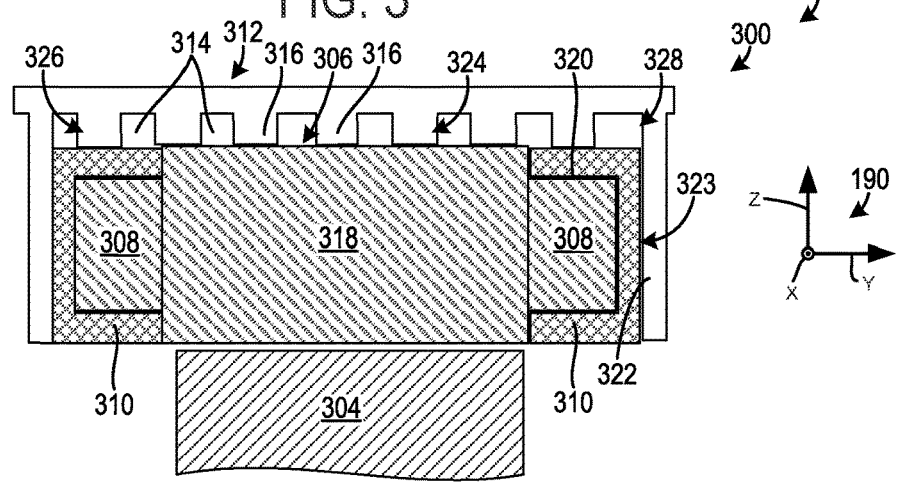
FIG. 3 is a second example of a cooling system for an electric motor.

FIG. 3 shows another embodiment of a cooling system 300 and electric motor 302. The electric motor 302 again includes a rotor 304 and a stator 306 with end windings 308 and potting material 310 at least partially enclosing the end windings.

A coolant passage housing 312 with a plurality of coolant passages 314 is again included in the cooling system 300. The coolant passage housing 312 has fins 316. A portion 324 of a plurality of fins are again shown in face sharing contact with a central stator section 318. Another portion 326 of the fins 316 are also shown in face sharing contact with circumferential surfaces 320 of the potting material 310. Correspondingly, a portion 328 of the coolant passages 314 traverse a section of the motor adjacent to the circumferential surfaces 320 of the potting material 310.

The housing 312 also include sections 322 in face sharing contact with opposing axial sides 323 of the potting material 310. Thus, the sections 322 of the housing 312 extend in a radial direction. Arranging the sections of the housing in this manner allows a greater amount of heat to be conducted away from the end windings 308 through the potting material 310.

Figure 4:
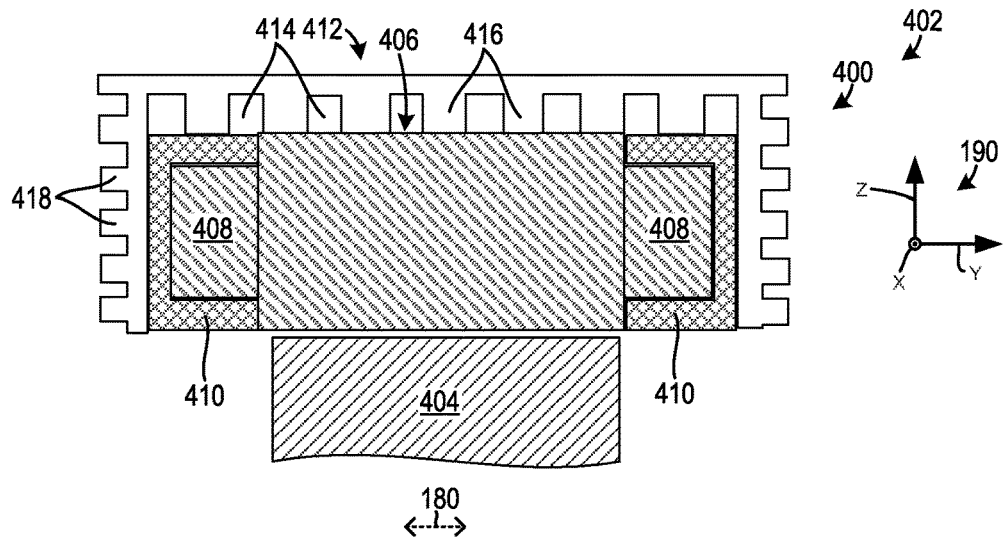
FIG. 4 is a third example of a cooling system for an electric motor.

FIG. 4 shows yet another embodiment of a cooling system 400 and electric motor 402. The electric motor again includes a rotor 404 and a stator 406 with end windings 408 and potting material 410 at least partially enclosing the end windings.

A coolant passage housing 412 with a plurality of coolant passages 414 is again included in the cooling system 400. The coolant passage housing 412 has fins 416 and sections similar to the housing 312, depicted in FIG. 3. However, the housing 412, depicted in FIG. 4, includes a portion 418 of the fins extending away from the stator's end windings 408. Specifically, the portion 418 of the fins are shown extending axially away from the end windings. However, other fin profiles have been envisioned. Arranging a plurality of outwardly extending fins on the housing further increases stator cooling as well as motor efficiency and performance.

Figure 5:
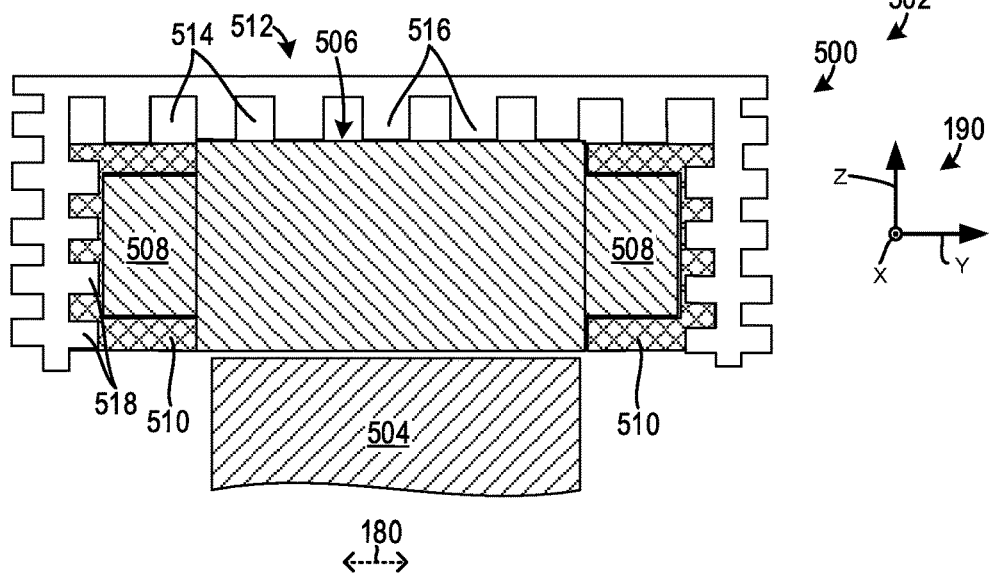
FIG. 5 is a fourth example of a cooling system for an electric motor.
Figure 6:
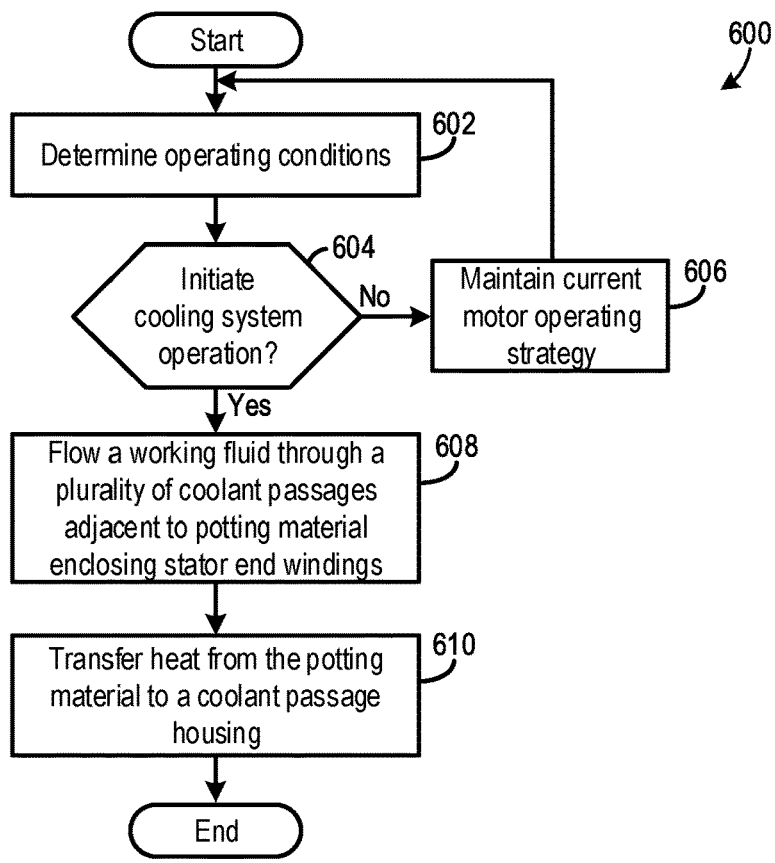
FIG. 6 is a method for operation of an electric motor cooling system.

FIG. 5 shows yet another embodiment of a cooling system 500 and electric motor 502. The electric motor again includes a rotor 504 and a stator 506 with end windings 508 and potting material 510 at least partially enclosing the end windings.

A coolant passage housing 512 with a plurality of coolant passages 514 is again included in the cooling system 500. The coolant passage housing 512 comprises fins 516. A portion of the fins 516 are similarly configured to those depicted in FIG. 4 and therefore redundant description is omitted for brevity. However, as shown in FIG. 5, a portion 518 of the fins extend inwardly into the potting material 510. In this way, additional heat may be thermally conducted from the potting material to the housing and then the surrounding environment. Arranging a portion of the fins inwardly extending into the potting material allows a greater amount of heat to be drawn out of the end windings using a compact fin arrangement. In one example, the fins extending into the potting material may extend through the potting material and include axial ends contacting the end windings. However, in other examples, the fins extending into the potting material may partially extend into the potting material and may not include ends contacting the end windings.

FIGS. 1-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

FIG. 6 shows a method 600 for operation of an electric motor cooling system. The method 600 may be implemented by any of the electric motors and cooling systems or combinations of the electric motors and cooling systems described above with regard to FIGS. 1-5. However, in other embodiments the method 600 may be implemented by other suitable electric motors and cooling systems.

At 602, the method includes determining operating conditions. The operating conditions may include motor speed, motor temperature, coolant temperature, ambient temperature, coolant pump speed, etc.

At 604, the method includes determining if cooling system operation should be initiated. Such a determination may take place based on motor temperature, coolant temperature, and/or motor output. For instance, if the motor temperature is greater than a threshold value and/or the motor is active, cooling system operation may be initiated. On the other hand, if the motor temperature is less than the threshold value and/or the motor is inactive, cooling system operation may not be initiated.

If it is ascertained that cooling system operation should not be initiated (NO at 604) the method moves to 606. At 606, the method includes maintaining the current motor operating strategy. For example, motor deactivation may be sustained. However, in other examples, if the motor is active but below a threshold temperature the motor activation may be sustained while the cooling system remains inactive.

Conversely, if it is ascertained that cooling system operation should be initiated (YES at 604) the method moves to 608 where the method includes flowing a working fluid through a plurality of coolant passages adjacent to potting material enclosing stator end windings and within a housing. In this way, the potting material cooling may be increased to correspondingly increase motor efficiency and performance. It will be appreciated that in some examples, the coolant pump's output may be adjusted to achieve a desired level of motor cooling during motor operation. For instance, feedback or feedforward control strategies may be used to control the coolant pump, in some embodiments. Next at 610, the method includes transferring heat from the potting material to the coolant passage housing. For example, heat fins in the housing may be in face sharing contact with the potting material to facilitate the heat transfer. As a result, a greater amount of heat may be flowed away from the end windings via the potting material to further increase motor efficiency and performance.

The cooling systems and methods for operating the cooling systems, described herein, have the technical effect of increasing electric motor cooling. Increasing motor cooling results in increased motor efficiency and performance.

The invention will be further described in the following paragraphs. In one aspect, an electric motor cooling system is provided. The electric motor cooling system includes a stator with a first end winding on a first axial side; a potting material at least partially enclosing the first end winding; a plurality of coolant passages adjacent to the stator, where at least a portion of the plurality of coolant passages are adjacent to the potting material; and a coolant passage housing including a plurality of fins defining a portion of the boundaries of the plurality of coolant passages and in face sharing contact with an outer surface of the stator.

In another aspect, a method for operating an electric motor cooling system is provided that comprises flowing a working fluid through a plurality of coolant passages adjacent to a stator, wherein at least a portion of the plurality of coolant passages are adjacent to a potting material at least partially enclosing an end winding of the stator; and transferring heat from the potting material to a coolant passage housing, the coolant passage housing including a plurality of fins defining a portion of the boundaries of the plurality of coolant passages and in face sharing contact with an outer surface of the stator.

In yet another aspect, an electric motor cooling system is provide that comprises: a stator at least partially surrounding a rotor, wherein the stator includes a first end winding on a first axial side and a second end winding on a second axial side; a potting material at least partially enclosing the first end winding and the second end winding; a plurality of coolant passages adjacent to the stator, wherein at least a portion of the plurality of coolant passages are adjacent to the potting material; and a coolant passage housing including a plurality of fins defining a portion of the boundaries of the plurality of coolant passages and in face sharing contact with an outer surface of the stator.

In any of the aspect or combinations of the aspects, the stator may include a second end winding on a second axial side and wherein the electric motor further comprises a potting material enclosing at least a portion of the second end winding.

In any of the aspect or combinations of the aspects, the coolant passage housing may include a section in face sharing contact along an outer axial side of the potting material.

In any of the aspect or combinations of the aspects, at least one of the plurality of coolant passages may be interposed between two of the plurality of fins.

In any of the aspect or combinations of the aspects, at least one of the plurality of fins may extend into the potting material.

In any of the aspect or combinations of the aspects, the coolant passage housing may include a plurality of fins extending away from the stator and spaced away from the plurality of coolant passages.

In any of the aspect or combinations of the aspects, a working fluid in the plurality of coolant passages may include water.

In any of the aspect or combinations of the aspects, the electric motor may be a synchronous electric motor.

In any of the aspect or combinations of the aspects, the coolant passage housing may contain aluminum.

In any of the aspect or combinations of the aspects, the coolant passage housing may include a section in face sharing contact along an outer axial side of the potting material.

In any of the aspect or combinations of the aspects, at least one of the plurality of coolant passages may be interposed between two of the plurality of fins.

In any of the aspect or combinations of the aspects, at least one of the plurality of fins may extend into the potting material.

In any of the aspect or combinations of the aspects, the plurality of fins may include two or more fins extending away from the stator and are spaced away from the plurality of coolant passages.

In any of the aspect or combinations of the aspects, the electric motor may be a synchronous electric motor and wherein the coolant passage housing may contain aluminum.

In any of the aspect or combinations of the aspects, the coolant passage housing may include a section in face sharing contact along an outer axial side of the potting material.

In any of the aspect or combinations of the aspects, at least one of the plurality of coolant passages may be interposed between two of the plurality of fins and wherein at least one of the plurality of fins extends into the potting material.

In any of the aspect or combinations of the aspects, the coolant passage housing may include a plurality of fins extending away from the stator and may be spaced away from the plurality of coolant passages.

In any of the aspect or combinations of the aspects, the coolant passage housing may be constructed out of metal and the working fluid in the coolant passages may include water or oil.

In another representation, an AC motor cooling system is provided with a thermally conductive metallic material in contact with potting material surrounding a plurality of stator end windings and a plurality of coolant passages traversing sections of a housing adjacent to axial ends of the stator end windings.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive.

Note that the example control and estimation routines included herein can be used with various electric motor and/or cooling system configurations. The control methods and routines disclosed herein may be stored as executable instructions in non-transitory memory and may be carried out by the control system including the controller in combination with the various sensors, actuators, and other system hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the control system, where the described actions are carried out by executing the instructions in a system including the various system hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to a variety of systems that include electric motors. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric motor cooling system comprising:
    a stator of an electric motor with a first end winding on a first axial side;
    a potting material at least partially enclosing the first end winding and including a resin and/or a thermosetting plastic;
    a plurality of coolant passages adjacent to the stator and positioned in a coolant passage housing;
    wherein at least a portion of the plurality of coolant passages are directly adjacent to an outer surface of the potting material;
    wherein the outer surface of the potting material is spaced away from the first end winding and an inner surface of the potting material directly contacts the first end winding;
    wherein the outer surface of the potting material forms a first portion of the boundaries of the plurality of coolant passages;
    wherein the coolant passage housing includes a plurality of fins defining a second portion of the boundaries of the plurality of coolant passages; and
    wherein a portion of the plurality of fins are in face sharing contact with the outer surface of the potting material.

2. The electric motor cooling system of claim 1, wherein the stator includes a second end winding on a second axial side and wherein the electric motor further comprises a potting material enclosing at least a portion of the second end winding.

3. The electric motor cooling system of claim 1, wherein the coolant passage housing includes a section in face sharing contact along an outer axial side of the potting material.

4. The electric motor cooling system of claim 1, wherein at least one of the plurality of coolant passages is interposed between two of the plurality of fins.

5. The electric motor cooling system of claim 1, wherein the potting material includes urethane.

6. The electric motor cooling system of claim 1, wherein the coolant passage housing includes a plurality of fins extending away from the stator and spaced away from the plurality of coolant passages.

7. The electric motor cooling system of claim 1, wherein the potting material includes silicone.

8. The electric motor cooling system of claim 1, wherein the electric motor is a synchronous electric motor.

9. The electric motor cooling system of claim 1, wherein a working fluid in the plurality of coolant passages includes oil.

10. A method for operating an electric motor cooling system, comprising:
    flowing a working fluid through a plurality of coolant passages adjacent to a stator of an electric motor;
    wherein at least a portion of the plurality of coolant passages are directly adjacent to an outer surface of a potting material that at least partially encloses an end winding of the stator;
    wherein the outer surface of the potting material is spaced away from the first end winding and an inner surface of the potting material directly contacts the first end winding;
    wherein the potting material includes a resin and/or a thermosetting plastic and a surface of the potting material forms a first portion of the boundaries of the plurality of coolant passages; and
    transferring heat from the potting material to a coolant passage housing;
    wherein the coolant passage housing includes a plurality of fins that define a second portion of the boundaries of the plurality of coolant passages; and
    wherein a portion of the plurality of fins are in face sharing contact with the outer surface of the potting material.

11. The method of claim 10, wherein the coolant passage housing includes a section in face sharing contact along an outer axial side of the potting material.

12. The method of claim 10, wherein at least one of the plurality of coolant passages is interposed between two of the plurality of fins.

13. The method of claim 10, wherein at least one of the plurality of fins extends into the potting material.

14. The method of claim 13, wherein the plurality of fins include two or more fins extending away from the stator and are spaced away from the plurality of coolant passages.

15. The method of claim 10, wherein the plurality of coolant passages have a series flow arrangement.

16. An electric motor cooling system comprising:
    a stator at least partially surrounding a rotor, wherein the stator includes a first end winding on a first axial side and a second end winding on a second axial side;
    a potting material at least partially enclosing the first end winding and the second end winding, wherein the potting material includes a thermosetting plastic that includes urethane;
    a plurality of coolant passages adjacent to the stator, wherein at least a portion of the plurality of coolant passages are directly adjacent to an outer surface of the potting material and a surface of the potting material forms a first portion of the boundaries of the plurality of coolant passages; and
    a coolant passage housing including a plurality of fins defining a second portion of the boundaries of the plurality of coolant passages;
    wherein a portion of the plurality of fins are in face sharing contact with the outer surface of the potting material;
    wherein the outer surface of the potting material is spaced away from the first end winding and an inner surface of the potting material directly contacts the first end winding; and
    wherein the plurality of coolant passages have a larger radius than the stator.

17. The electric motor cooling system of claim 16, wherein the coolant passage housing includes a section in face sharing contact along an outer axial side of the potting material.

18. The electric motor cooling system of claim 16, wherein at least one of the plurality of coolant passages is interposed between two of the plurality of fins and wherein at least one of the plurality of fins extends into the potting material.

19. The electric motor cooling system of claim 16, wherein the coolant passage housing includes a plurality of fins extending away from the stator and are spaced away from the plurality of coolant passages.

20. The electric motor cooling system of claim 16, wherein the coolant passage housing is constructed out of metal and wherein a working fluid in the coolant passages includes water or oil.

* * * * *